(12) United States Patent
Kato

(10) Patent No.: US 9,644,777 B2
(45) Date of Patent: May 9, 2017

(54) VIBRATION-PROOF CLAMP

(71) Applicant: NEWFREY LLC, Newark, DE (US)

(72) Inventor: Hiroyuki Kato, Utsunomiya (JP)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 14/844,093

(22) Filed: Sep. 3, 2015

(65) Prior Publication Data
US 2016/0076689 A1 Mar. 17, 2016

(30) Foreign Application Priority Data

Sep. 12, 2014 (JP) ................................. 2014-186138

(51) Int. Cl.
*F16L 3/22* (2006.01)
*F16L 55/035* (2006.01)
*F16L 3/10* (2006.01)
*F16L 3/237* (2006.01)

(52) U.S. Cl.
CPC ........... *F16L 55/035* (2013.01); *F16L 3/1091* (2013.01); *F16L 3/237* (2013.01)

(58) Field of Classification Search
CPC ..... F16L 3/1058; F16L 3/1091; F16L 3/2235; F16L 3/237; F16L 55/035
USPC ............................. 248/62, 68.1, 71, 73, 74.1
See application file for complete search history.

(56) References Cited

U.S. PATENT DOCUMENTS

| 7,328,873 B2 * | 2/2008 | Suzuki | F16L 55/035 248/55 |
| 2007/0246614 A1 * | 10/2007 | Allmann | F16L 3/2235 248/65 |
| 2008/0017761 A1 * | 1/2008 | Hashimoto | F16L 3/2235 248/68.1 |
| 2010/0207001 A1 * | 8/2010 | Smith | F16L 3/1075 248/230.4 |
| 2012/0014767 A1 * | 1/2012 | Pearson | F16B 37/0842 411/511 |
| 2012/0153095 A1 * | 6/2012 | Child | F16L 3/2235 248/68.1 |

FOREIGN PATENT DOCUMENTS

| JP | 4036557 B | 1/2008 |
| JP | 4359080 B | 11/2009 |
| JP | 4550668 B | 9/2010 |

* cited by examiner

*Primary Examiner* — Gwendolyn Baxter
(74) *Attorney, Agent, or Firm* — Michael P. Leary

(57) ABSTRACT

A vibration-proof clamp includes a clamp body made of rigid resin and having a pipe clamp portion for holding pipes and a stud mounting portion for mounting to a stud; a cover for covering the pipe clamp portions of the clamp body; the cover connected to the clamp body; a first rubber member made of rubber or soft resin for mounting to the clamp body; and a second rubber member for mounting to the cover; the second rubber member having the shape and size which are the same as those of the first rubber member. Holding end portions of the first and second rubber members have semicircular shapes in cross section. The clamp body has rubber bottom holding portions for holding the holding end portions of the first rubber member. The cover has rubber top holding portions for holding the holding end portions of the second rubber member.

14 Claims, 11 Drawing Sheets

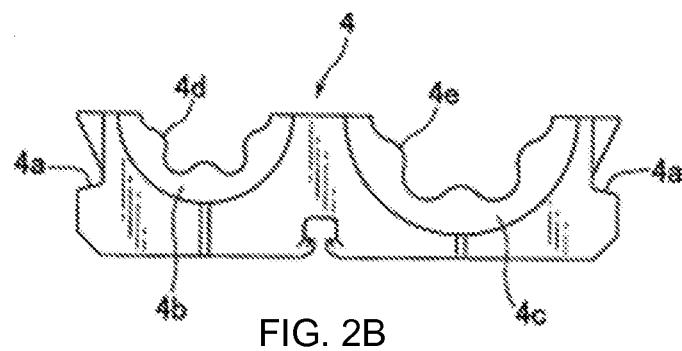
FIG. 2B
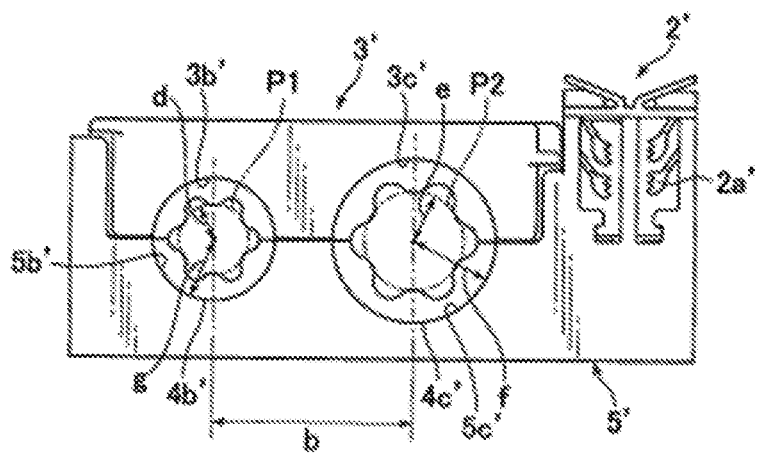
FIG. 3A
FIG. 3B

VIBRATION-PROOF CLAMP

CROSS-REFERENCE TO RELATED APPLICATION

This application claims priority from Japanese Patent Application No. 2014-186138, filed on Sep. 12, 2014, the disclosure of which is incorporated herein by reference.

BACKGROUND OF THE INVENTION

The present invention pertains to a clamp for holding elongated members such as pipes, tubes, or wire harnesses to attached members such as an automobile body panel or the like, and in particular pertains to an anti-vibration clamp which does not transfer vibration from elongated members such as pipes, tubes or wire harnesses to attached members such as body panels or the like, and vice-versa.

A pipe clamp comprises a clamp portion for holding a pipe and a locking portion for affixing to an attached member such as an automobile body panel or the like, whereby the pipe is held by the clamp portion and the locking portion is affixed to the attached member. The clamp portion has an open part at the top for receiving pipes, and is constituted to house a pipe in the U-shaped space formed by a pair of side wall portions and the bottom portion; the housed pipe is held so that it cannot pull out of the clamp portion. There are also instances where the top of the clamp portion is covered by a cover. The locking portion has an affixing means for attaching to an attached member such as a body panel, and is affixed to the attached member such an automobile body panel.

In some cases, vibration can occur in pipes due to the pulsation of fluids passing through the pipe, etc. Transfer of this type of vibration through the pipe clamp to the vehicle side should be avoided. It is also necessary that vehicle-side vibration not be transferred through the pipe clamp to the pipe.

For this reason, there are pipe clamps with enhanced vibration-proof characteristics achieved by forming the clamp body of hard resin and forming rubber members of rubber or soft resin to hold pipes. In such pipe clamps, the pipe does not directly contact the clamp body made of hard resin, so such clamps are highly vibration-proof.

However, in such pipe clamps, if the pipe is wide, or if pipe pitches differ, separate rubber members and separate clamp bodies must be used. This required fabrication of different rubber members and clamp bodies for each design.

Also, to avoid incorrectly assembling a specified rubber member to an incorrect other rubber member, and to avoid assembly in the wrong direction of attachment, a mis-assembly prevention mating portion, or a mis-assembly prevention stop, was required. This resulted in more complicated metal molds for clamp bodies and rubber members.

FIGS. 1A-3B illustrate an example of a conventional vibration-proof clamp. FIG. 1A is a front elevation of a conventional vibration-proof clamp; FIG. 1B is a cross-section thereof. FIG. 2A is a perspective view of a vibration-proof clamp rubber member; FIG. 2B is a cross-section thereof.

This vibration-proof clamp includes a clamp body 5 made of hard resin for attaching to a stud, a cover 3 for covering the top side of clamp body 5, one rubber member 4 attached to clamp body 5, and a separate rubber member 4 attached to cover 3. Rubber member 4 attached to clamp body 5 and rubber member 4 attached to cover 3 are the same shape and size. A single rubber member 4 has two pipe holding portions, semicircular in cross section. Two pipes of differing diameters can be held by two sets of rubber members 4 above and below.

Clamp body 5 has a rubber bottom holding portion for holding rubber member 4, and a locking portion 2 for affixing to studs installed on a body panel or the like. A locking claw 2a for locking to a stud or the like is provided on locking portion 2.

As shown in FIGS. 1A and 1B, rubber bottom holding portions 5b, 5c, semicircular in front elevation, are formed on the ends of the rubber bottom holding portion in the width direction. Rubber affixing portion 5a is provided on clamp body 5 for affixing rubber member 4.

Rubber top holding portions 3b, 3c, semicircular in front elevation, are formed in the width direction on the end portions of cover 3.

A rubber affixing portion 3a is provided on cover 3 for affixing rubber member 4.

A main unit locking foot 3d and locking claw 3e are provided as connecting means for joining with clamp body 5. A locking projection 5d is provided on clamp body 5 as a connecting means for joining main unit locking foot 3d and locking claw 3e. When cover 3 and clamp body 5 are joined by a connecting means, a pipe holding space is formed between the two rubber members 4.

As shown in FIGS. 2A and 2B, rubber member 4 has semicircular holding end portions 4b, 4c at the ends in the width direction. Holding end portions 4b, 4c are shaped to conform to rubber bottom holding portions 5b, 5c of clamp body 5. Also, holding end portions 4b, 4c are shaped to conform to rubber top holding portions 3b, 3c on cover 3.

As shown in FIGS. 1B and 2A, rubber member 4 is provided with a rubber affixing portion 5a on clamp body 5, and a rubber projecting portion 4a to which the rubber affixing portion 3a on the cover locks. Rubber member 4 has a pipe holding portion for holding a pipe; ribs 4d, 4e are formed on the pipe holding portion, such that the pipe is supported by ribs 4d, 4e.

Referring now to FIG. 1, the radius of the clamp body rubber bottom holding portion 5b for holding thin pipe P1 of radius d in FIG. 1A is g; the radius of the clamp body rubber bottom holding portion 5c for holding wide pipe P2 of radius e is f. The center-to-center distance between these two pipes P1 and P2 is a.

A mis-assembly prevention mating portion 8 is provided to separate cover 3, clamp body 5, and rubber member 4 from other covers, clamp bodies and rubber members.

FIG. 3A is a front elevation of a different vibration-proof clamp for holding two pipes; FIG. 3B is a cross section thereof. The FIG. 3A clamp holds the same two pipes P1, P2 as the vibration-proof clamp in FIG. 1A. The center-to-center distance between narrow pipe P1 of radius d and wide pipe P2 of radius e is b.

Since the pipe-to-pipe distance, or pitch, between the two pipes is different from that of the vibration-proof clamp shown in FIG. 1A, the vibration-proof clamp shown in FIGS. 3A and 3B must use a rubber member 4' different from the rubber member 4 shown in FIG. 1A. A clamp body 5' and cover 3' different from the clamp body 5 and cover 3 shown in FIG. 1A must also be used. A "prime" symbol is appended to the reference numerals for the respective members and parts of the vibration-proof clamp in FIGS. 3A, 3B.

Also, in order to distinguish in practice rubber member 4' used in the FIG. 3A vibration-proof clamp from the rubber member 4 used in the FIG. 1A vibration-proof clamp, a mis-assembly prevention mating portion 8' and mis-assembly prevention shape 9' are required.

In cases where, unlike the illustrated example, the FIG. 1A vibration-proof clamp and pipe diameter differ while pipe pitch is the same, a rubber member different from rubber member 4 must be used. A clamp body and cover different from clamp body 5 and cover 3 must also be used.

Thus, when the sizes of the pipes being held are different but the pitches are the same, or when the pitches of the pipes being held are different but the pipe sizes are the same, the rubber members, clamp bodies, and covers used must all be different.

A pipe clamp has therefore been sought with which, to the extent possible, the same clamp bodies and covers and the same rubber members can be used, even when pipe sizes and pitches differ. A pipe clamp with which a specified rubber member can be easily distinguished is also sought.

Patent Citation 1 discloses a pipe clamp comprising a clamp body for holding a pipe or the like, a cover, and a vibration dampening member between the cover and the clamp body, whereby vibration is prevented from being transferred to the pipe by the vibration dampening member.

Multiple ribs project from pipe-facing surface of the vibration dampening member toward the pipe, extending circumferentially from the outside surface of the pipe, separated by intervals in the axial direction of the pipe, and the tip surfaces of the ribs form the pipe holding surface.

In the vibration-proof clamp of Patent Citation 1, each pipe is held by multiple spaced ribs, so the side surface of the pipe is held partially; hence, there is no loss in the vibration dampening effect, even if the strength of the vibration dampening member is raised to increase holding strength.

The vibration-proof clamp of Patent Citation 1 is arranged so that the two vibration dampening members which are mounted between the clamp body and the cover hold multiple pipes from above and below. Therefore, in this clamp, when pipe sizes and pitches differ, separate vibration dampening members are required. Also, a mis-assembly prevention mating portion or mis-assembly prevention shape is required to differentiate vibration dampening members. Finally, separate clamp bodies and covers must be prepared.

Patent Citation 2 discloses a clamp fitted with a substantially U-shaped elastic member between one clamp portion and another clamp portion rotatably linked by a hinge portion. Patent Citation 2 comprises a lock mechanism resistant to removal when one clamp portion is rotated toward the other clamp portion so that the locking surface is engaged.

The clamp of Patent Citation 2 holds a single pipe with two elastic members above and below. If pipe sizes differ, separate vibration dampening members and separate clamp bodies and covers are required.

Patent Citation 3 discloses a clasp and a piping affixing member furnished with a rubber elastic body held by the clasp, for elastically supporting the piping. By providing insertion holes in the clasp and insertion projections in the rubber elastic body, the rubber elastic body can be assembled to the clasp by pressure insertion of the insertion projections into the insertion holes.

The piping affixing member in Patent Citation 3 holds multiple pipes with two rubber elastic bodies above and below. Therefore, when pipe sizes and pitches differ, separate rubber elastic bodies and separate clamp bodies and covers are required.

Therefore, a vibration-proof pipe clamp has been sought with which, to the extent possible, the same rubber members and the same clamp bodies and covers can be used, even when pipe sizes and pitches differ.

A vibration-proof clamp capable of easily distinguishing specified rubber members has also been sought.

Patent Citation 1: Japan Published Unexamined Patent Application 2006-336732=JP4550668.
Patent Citation 2: Japan Published Unexamined Patent Application 2000-205211=JP4036557.
Patent Citation 3: Japan Published Unexamined Patent Application 2005-9613=JP4359080.

SUMMARY OF THE INVENTION

The object of the present invention is to provide a vibration-proof clamp capable of using the same clamp bodies and covers even when the sizes of attached pipes differ.

Another object is also to provide a vibration-proof clamp capable of using the same rubber members, even when the pitch of attached pipes differs.

Yet another object of the present invention is to provide a vibration-proof clamp with which specified rubber members can be easily distinguished.

In one embodiment of the vibration-proof clamp of the present invention, the rubber members attached to the clamp body and the rubber members attached to the cover have the same shapes and sizes. Also, the holding end portions in the width-wise end portions of the rubber members conform both to the rubber bottom holding portion of the clamp body and the rubber top holding portion of the cover.

In a vibration-proof clamp of the present invention by which multiple pipes or other elongated members are attached, the rubber members are separated, so that there is one set of rubber members for each elongated member. However, the shapes and sizes of the holding end portions of each rubber member is the same, even if the outside diameters of the elongated members being held differ.

The shapes and sizes of each of the clamp body rubber bottom holding portions are the same, and the shapes and sizes of each of the cover rubber top holding portions are the same. In each part, those dimensions which can be made uniform are made uniform.

One embodiment of the present invention is a vibration-proof clamp for holding an elongated member, including a clamp body having a holding portion for holding the elongated member, a locking portion for locking to an attached member; a cover connected to the clamp body so as to cover the holding portion of the clamp body; a first rubber member attached to the clamp body so as to hold the side surface of a first semicircular part of the elongated member; and a second rubber member attached to the clamp body so as to hold the side surface of a second semicircular part of the elongated member, with the same shape and size as the first rubber member; whereby the first and second rubber members have holding end portions on the end portions of the rubber members in the width direction, the end portions being formed on each end in the width direction of the rubber members; the clamp body has a rubber bottom holding portion of a shape conforming to the holding end portions, in order to support the first rubber member holding end portions on both end portions in the width direction; and the cover has a rubber top holding portion with a shape conforming to the holding end portions, in order to support the second rubber member holding end portions on both end portions in the width direction.

Since the shapes and sizes of the first rubber member and the second rubber member are the same, the same rubber members can be attached without distinguishing between clamp bodies or covers. Hence, there are fewer part types, and attachment can be efficiently performed.

If the clamp body rubber bottom holding portion and the cover rubber top holding portion have shapes conforming to the first and second rubber member holding end portions, then the first rubber member can be held by the clamp body rubber bottom holding portion, and the second rubber member can be held by the cover rubber top holding portion.

It is preferable for the first and second rubber member holding end portions to be semicircular in cross section; and for the clamp body rubber bottom holding portion and cover rubber top holding portion to be a portion indented from the sides of the clamp body and the cover, respectively, and also to be semicircular in cross section.

Radially-inwardly projecting ribs extending in the width direction are preferably formed in the first and second rubber member pipe holding portions.

If ribs extending in the width direction are formed in the first and second rubber member pipe holding portions, then only the ribs will contact the pipe or other elongated member; therefore, the pipe can be held in a way which attenuates vibration.

In another embodiment of the present invention, the clamp includes multiple first rubber members and multiple second rubber members, and is capable of holding multiple elongated members; the shapes and sizes of the first and second rubber member holding end portions supporting each elongated member are the same. Therefore the clamp body has multiple rubber bottom holding portions, the shapes and sizes of each of the rubber bottom holding portions being the same; and the cover has multiple rubber top holding portions, and the shapes and sizes of each of the rubber top holding portions are the same.

If the shapes and sizes of the first and second rubber member holding end portions are made uniform, and the shapes and sizes of the clamp body rubber bottom holding portions and the cover rubber top holding portions are made uniform, then the same rubber members can be used when elongated members at differing pitches and of the same diameter are attached to the clamp.

The multiple elongated members include elongated members of differing diameters.

When attaching elongated members such as pipes with the same pitch but differing diameters, the shapes of each of the rubber bottom holding portions on the clamp body and the shapes of each of the rubber top holding portions on the cover are the same, so the same clamp bodies and covers can be used.

In another embodiment of the clamp of the present invention, the rubber members used on elongated members of differing diameters are in different colors.

Distinguishing the rubber members used for elongated members of differing diameters by color allows rubber members to be more simply distinguished than by forming mis-assembly prevention mating portions or mis-assembly prevention shapes.

One embodiment of the clamp of the present invention includes a clamp body having a rubber bottom affixing foot for affixing the first rubber member; and a cover having a rubber top affixing foot of the same shape as the rubber bottom affixing foot in order to affix the second rubber member. Affixing foot receiving holes are formed in the first and second rubber members in order to insert rubber bottom affixing feet or rubber top affixing feet, as the case may be. A clamp body rubber bottom affixing foot is inserted into the first rubber member affixing foot receiving hole so that the first rubber member is joined to the clamp body; and a cover rubber top affixing foot is inserted into the second rubber member affixing foot receiving hole so that the second rubber member is joined to the cover.

If the clamp body has a rubber bottom affixing foot, and the cover has a rubber top affixing foot, then rubber members can be respectively tightly affixed to the clamp body and cover.

If the clamp body rubber bottom affixing foot and the cover rubber top affixing foot have the same shapes and sizes, then the same rubber members can be attached to the clamp body and to the cover.

In one embodiment of the clamp of the present invention, the cover has a main body locking portion and a folded-back elastically-deformable locking claw disposed at the tip portion of the main body locking portion; the clamp body has a locking projection for the cover locking claw to engage; and the cover is joined or connected with the clamp body by the locking engagement of the cover locking claw with the locking projection on the clamp body.

If the cover has a main body locking portion and locking claw as joining means between the cover and the clamp body, and the clamp body has a locking projection for engagement with the locking claw, then the cover and the clamp body can be joined or connected so that they will not easily separate.

The present invention provides a vibration-proof clamp capable of using the same clamp bodies and covers, even when the sizes of attached pipes differ.

A vibration-proof clamp according to the present invention capable of using the same rubber members even when the pitches of attached pipes differ can also be provided.

A vibration-proof clamp of the present invention capable of easily distinguishing specified rubber members can further be provided.

BRIEF DESCRIPTION OF THE DRAWINGS

FIG. 2B: A front elevation of a rubber member in a conventional vibration-proof clamp.

FIG. 3A: A front elevation of a different conventional vibration-proof clamp.

FIG. 3B: A cross-section of the vibration-proof clamp of FIG. 3A.

DESCRIPTION OF THE PREFERRED EMBODIMENTS

Figure 1A:
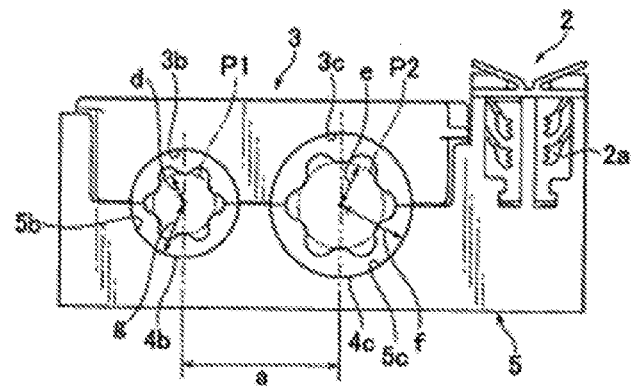
FIG. 1A: A front elevation of a conventional vibration-proof clamp.
Figure 1B:
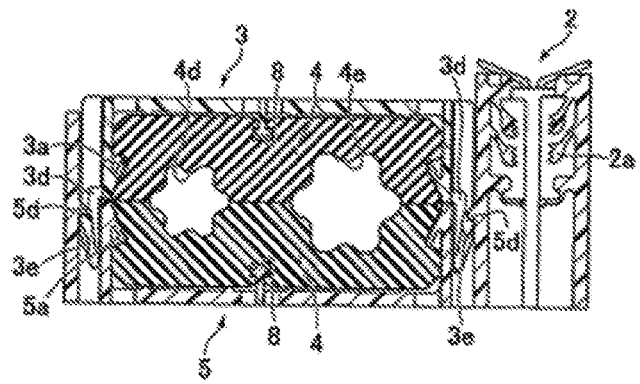
FIG. 1B: A cross-section of the vibration-proof clamp of FIG. 1A.
Figure 2A:
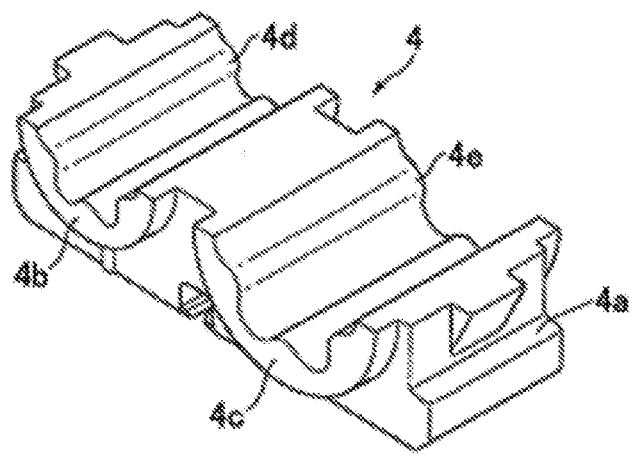
FIG. 2A: A perspective view of a rubber member in a conventional vibration-proof clamp.

Referring to the figures, a vibration-proof clamp 1 according to an embodiment of the present invention is described below. Vibration-proof clamp 1 holds a pipe, an elongated member, or the like, and includes a clamp body 10 made of a hard resin for attaching to a stud; a cover 30 covering the top side of clamp body 10; and resilient or rubber members 40a, 40b. It should be noted that although members 40a and 40 be are referred to as "rubber", they may be made of any resilient material suitable for vibration-dampening and for holding pipes, such as soft resin or rubber, and are attached, respectively, to clamp body 10 and cover 30.

For this embodiment of the present invention, a vibration-proof clamp 1 for holding two pipes is described, but the number of held pipes is not limited to two. The invention may also be applied to a vibration-proof clamp for holding a single pipe, or to a vibration-proof clamp for holding three or more pipes.

Since rubber member 40a attached to clamp body 10 (the first rubber member) and rubber member 40a attached to cover 30 (the second rubber member) have the same size and shape, they are indicated by using the same part name and reference numeral. Rubber member 40b attached to clamp body 10 and rubber member 40b attached to cover 30 likewise have the same size and shape and are therefore indicated using the same part name and reference numeral.

In a vibration-proof clamp of the present invention holding multiple pipes, rubber members 40a, 40b attached to clamp body 10 and rubber members 40a, 40b attached to cover 30 are each separated at each pipe, so that a discrete set of rubber members 40a, 40a hold one pipe and a discrete set of rubber members 40b, 40b hold the other pipe.

The clamp body 10 will now be described with reference to FIGS. 10-12; then, the cover 30 will be described with reference to FIGS. 13-15. Next, referring to FIGS. 16-21, the rubber member 40a will be described; and then, referring to FIGS. 22-27, the rubber member 40b will be described.

Thereafter, with reference to FIGS. 4-9, the assembly of a vibration-proof clamp 1 including clamp body 10, cover 30 and rubber members 40a, 40b, will be described.

Figure 5:
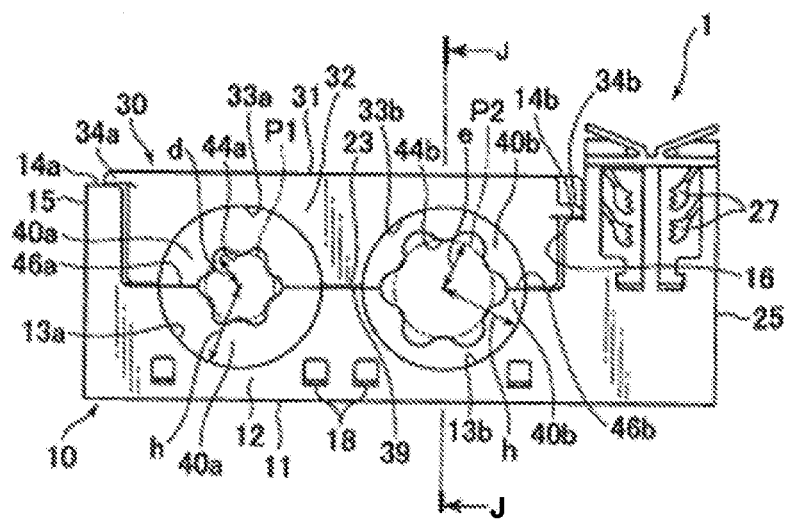
FIG. 5: A front elevation of the vibration-proof clamp of FIG. 4.
Figure 6:
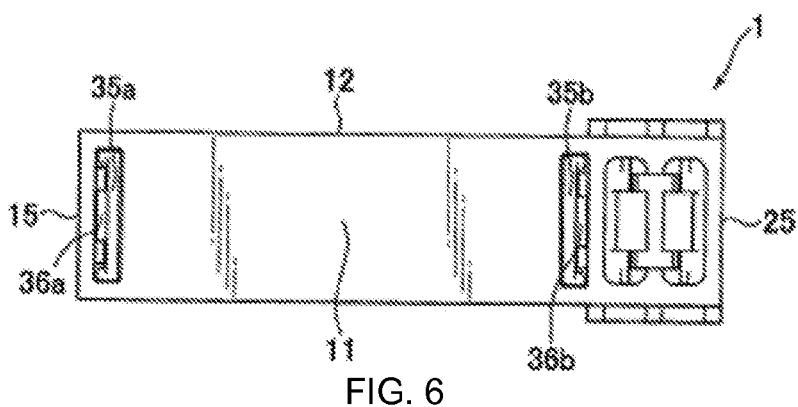
FIG. 6: A bottom plan view of the vibration-proof clamp of FIG. 4.

Referring to the front elevation of vibration-proof clamp 1 in FIG. 5, the length direction is called the "lateral direction", the depth direction is called the "width direction", and the vertical direction is called the "height direction".

Figure 10:
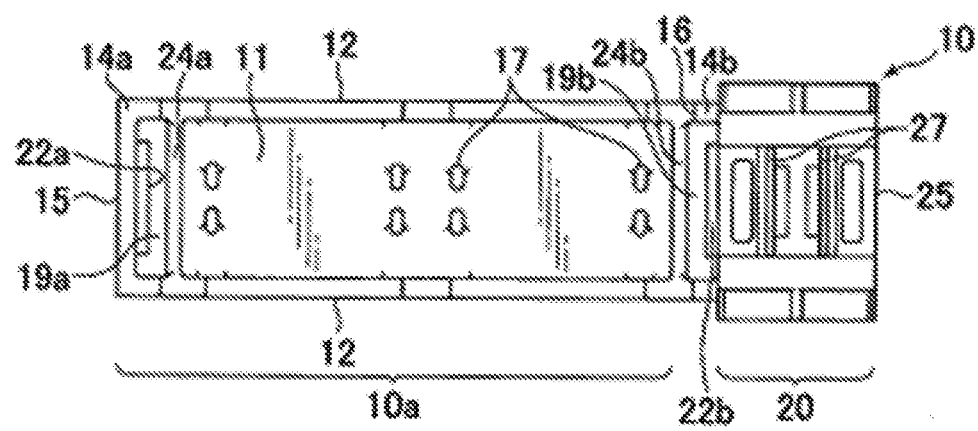
FIG. 10: A top view of a clamp body in a vibration-proof clamp of the present invention.

As previously noted, FIG. 10 is a top view of clamp body 10; FIG. 11 is a front elevation thereof; and FIG. 12 is a cross-section along line G-G in FIG. 11.

Figure 11:
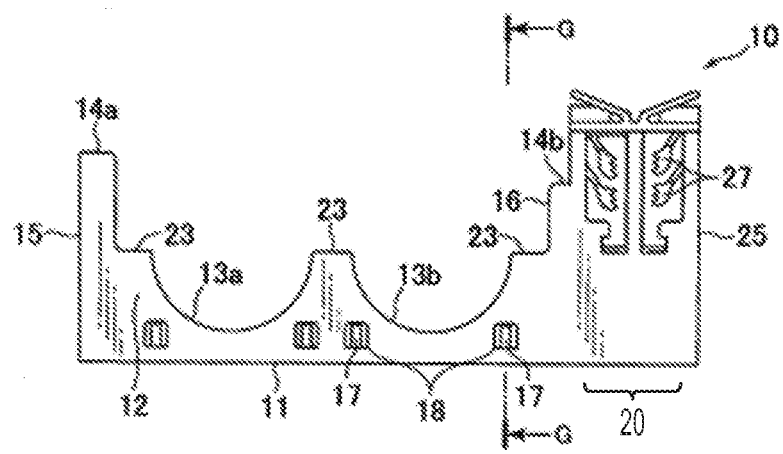
FIG. 11: A front elevation of the clamp body of FIG. 10.
Figure 12:
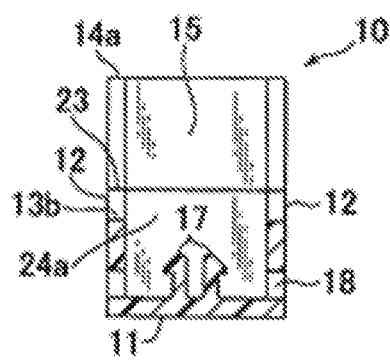
FIG. 12: A front elevation, along line G-G in FIG. 11, of the clamp body of FIG. 10.

Referring to FIGS. 10-12, clamp body 10 includes a holding portion 10a for holding rubber members 40a, 40b, which in turn hold various pipes such as fuel pipes, brake fluid pipes, etc.; and a locking portion 20, disposed on the side of holding portion 10a, for affixing to a stud (not shown) mounted on the side of a body panel or the like.

Clamp body 10 is formed of a hard resin such as polyacetol (POM) or the like.

As shown in the top view of FIG. 10, clamp body 10 is an essentially elongated member when seen from above; the bottom of clamp body 10 has an elongated bottom surface portion.

As shown in the front elevation of FIG. 11, clamp body 10, according to the present invention, has side surface portions 12 on both ends in the width direction.

Side surface portions 12 define two rubber bottom holding portions (or bottom holding portions) 13a, 13b, semicircular in cross-section, on both ends in the width direction of the clamp body 10, to hold the two rubber members 40a, 40b. Thus, as shown in FIGS. 11 and 12, clamp body 10 includes two rubber bottom holding portions 13a and two rubber bottom holding portions 13b.

In FIG. 11, flat top surfaces 23 are formed on the left side of rubber bottom holding portion 13a, on the right side of rubber bottom holding portion 13b, and between rubber bottom holding portions 13a and 13b.

The number of rubber members 40a, 40b attached is not limited to two. Therefore, the number of rubber bottom holding portions 13a, 13b changes according to the number of rubber members 40a, 40b being attached.

Referring to FIGS. 10-12, an end portion wall 15 extends upward on one of the lateral end portions on clamp body holding portion 10a. Thus the rubber bottom holding portions 13a, 13b are indented respectively from end portion wall 15 and center wall 16. The top end portion of end portion wall 15 serves as a cover contact portion 14a; a cover main body contact portion 34a makes contact here. (See FIGS. 13 and 14.)

Referring to FIG. 10, a locking foot receiving hole or cavity 19a is drilled or otherwise formed into end portion wall 15, forming end surface portion 24a.

The other lateral end portion of holding portion 10a is center wall 16, and locking portion 20 extends in the lateral direction of center wall 16, as shown in FIGS. 10 and 11. A cover contact portion 14b (FIG. 11) is formed at a height slightly below the height of cover contact portion 14a on end portion wall 15; this is where cover 30 main body contact portion 34b makes contact (See FIGS. 13 and 14).

Referring to FIG. 10, a locking foot receiving hole or cavity 19b is also drilled or otherwise formed into center wall 16, forming end surface portion 24b.

As shown in FIG. 12, which is a cross-section along line G-G in FIG. 11, in order to attach rubber member 40b to clamp body 10, a rubber bottom affixing foot (or bottom affixing foot) 17 formed of two affixing feet, spaced apart in the width direction, is disposed on the bottom surface portion 11 of clamp body 10. The tip portions of rubber bottom affixing foot 17 spread downward from the tip of foot 17, forming a step portion, and have a narrow width below the step portion. The step portion of rubber bottom affixing foot 17 resists removal once locked with an affixing foot receiving hole 45 in rubber members 40a and 40b. (See FIGS. 9, 16 and 22).

Two sets of rubber bottom affixing feet 17 are mounted in the lateral direction for each rubber member 40a. In the embodiment of the present invention illustrated in FIG. 9, two rubber members 40a, 40b are combined in a single clamp body 10; therefore, rubber bottom affixing feet 17 are provided in a total of four locations in the clamp body.

As shown in FIGS. 11 and 12, affixing foot-forming holes 18 for forming rubber bottom affixing feet 17 are formed on side surface portions 12.

Figure 7:
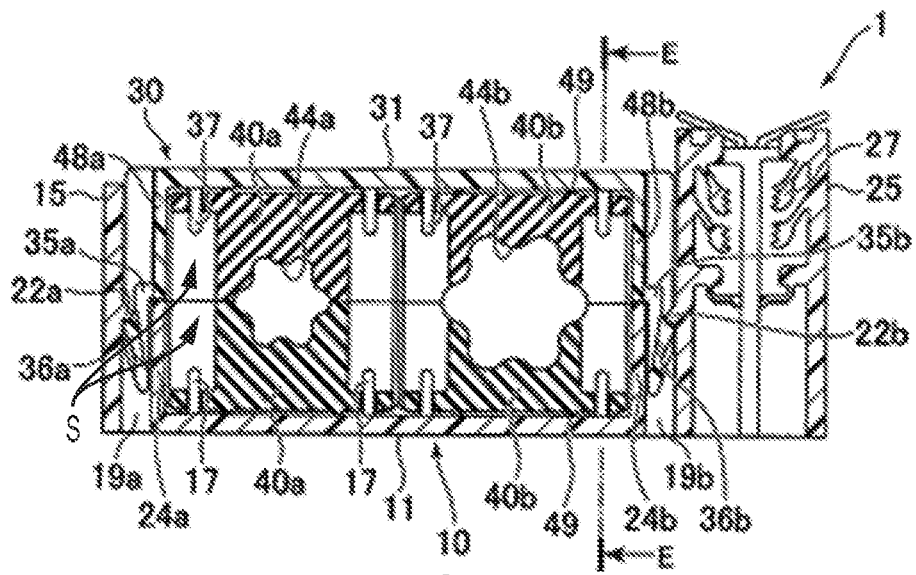
FIG. 7: A cross-section along line D-D of the vibration-proof clamp of FIG. 4.

In order to connect cover 30 to clamp body 10, a locking foot receiving hole 19a for receiving the cover main body locking foot 35a extends vertically on the lateral interior side of end portion wall 15 (FIGS. 7 and 10). A locking projection 22a to engage and lock with cover main body locking claw 36a is formed on the interior surface of end portion wall 15.

As shown in FIG. 11, locking portion 20 for attaching to a stud is disposed on the lateral side of clamp body 10. However, it will be appreciated that if desired, the locking portion 20 may be disposed elsewhere on the clamp 1.

In this embodiment of the present invention, an end portion wall 25 extending in the width direction is disposed on one side in the lateral direction of locking portion 20. The border portion between locking portion 20 and holding portion 10a is center wall 16.

With reference to FIGS. 5 and 7, two locking claws 27 extend diagonally downward from the top side of center wall 16 in order to engage the screw threads on the stud.

Two locking claws 27 also extend diagonally downward from the top side of end portion wall 25. The space enclosed by the left and right locking claws 27 is the stud space for receiving a stud. Studs are inserted downward from the top side in the figure, and multiple pairs of locking claws 27 engage screw threads or perimeter channels in the studs.

The number and shape, etc. of locking claws 27 can be changed according to stud parameters. As noted above, the position, structure, etc. of locking portion 20 can be changed according to stud and body panel parameters, etc.

The means for attaching clamp body 10 to a body panel or the like are not limited to locking onto a stud with locking claws 27. Clamp body 10 can be attached to a body panel or the like on the vehicle side using an anchor foot clip or other known method.

The cover 30 will be described next. FIG. 13 is a top view of cover 30; FIG. 14 is a front elevation thereof; FIG. 15 is a cross section along line F-F of FIG. 13. Cover 30 also holds rubber members 40a, 40b for holding pipes. Cover 30 is combined with clamp body 10, to which separate rubber members 40a, 40b of the same shape and size are attached, to hold a pipe. Cover 30 is formed of the same hard resin as clamp body 10, such as polyacetol (POM), or the like.

Figure 13:
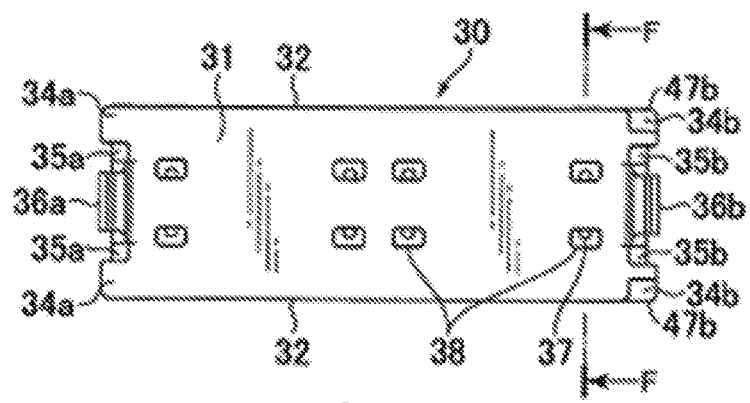
FIG. 13: A top plan view of a vibration-proof clamp cover according to the present invention.
Figure 14:
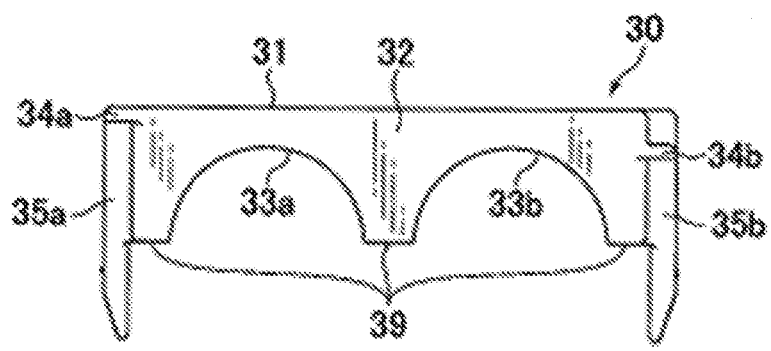
FIG. 14: A front elevation of the cover of FIG. 13.

As shown in FIGS. 13 and 14, cover 30 is an elongated member as seen from above and has an elongated top surface portion 31 on the top side thereof. Cover 30 has two side surface portions 32. Two rubber top holding portions 33a, 33b, (or top holding portions) semicircular in front elevation, are formed in the width-direction side portions 32 to support rubber members 40a, 40b at the bottom end portions of side surface portions 32. Rubber top holding portion 33a and rubber top holding portion 33b have the same radius. As was noted for the clamp body 10, one set of rubber top holding portions 33a, 33b is formed in each of the two cover side surface portions 32, resulting in a total of two rubber top holding portions 33a and two rubber top holding portions 33b which support respective rubber members 40a and 40b.

When cover 30 is combined with clamp body 10, main body contact portions 34a, 34b, which contact clamp body cover contact portions 14a, 14b, respectively, are formed on the lateral end portions of cover top surface portion 31. (See, for example, the assembly of FIG. 5.)

Figure 4:
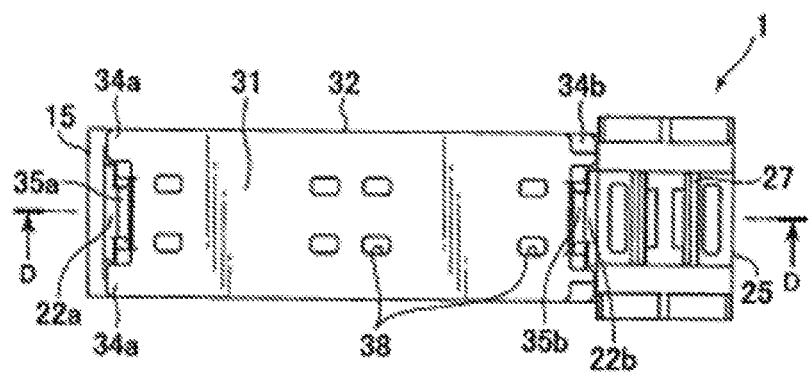
FIG. 4: A top plan view of a vibration-proof clamp according to an embodiment of the present invention.

As shown in FIG. 7, which is a cross-section along line D-D in FIG. 4, end surface portions 48a, 48b are formed on the lateral end portions of cover 30 at the center in the width direction. When cover 30 is connected to clamp body 10, the bottom end portions of end surface portions 48a, 48b contact the top end portions of clamp body 10 end surface portions 24a, 24b, respectively.

As illustrated in FIG. 14, a flat bottom surface 39 is formed on the right side of rubber top holding portion 33b, on the left side of rubber top holding portion 33a, and between rubber top holding portion 33a and 33b. Bottom surface 39 contacts the top surface 23 of clamp body 10 when cover 30 is connected to clamp body 10.

Figure 15:
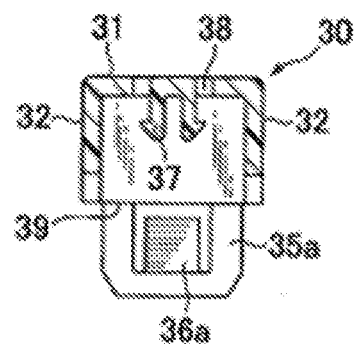
FIG. 15: A front elevation cross-section along line F-F of the cover of FIG. 13.

As shown in FIGS. 13-15 and 7, in order to connect cover 30 to clamp body 10, main body locking foot 35a for engaging with clamp body 10 is formed so as to extend straight downward between two main body contact portions 34a on the lateral end portions at the left side of cover 30. Main body locking foot 35a folds back at the tip portion, becoming upward-extending main body locking claw 36a (FIG. 15).

As seen in FIG. 7, main body locking claw 36a elastically spreads to the left, locking to locking projection 22a, and cover 30 is locked to clamp body 10 so that it is not easily disengaged.

Similarly, main body locking foot 35b for locking to clamp body 10 is formed to extend straight downward between the two main body contact portions 34b on the lateral end portions at the right side of cover 30. Main body locking foot 35b folds back at the tip portion, becoming upward-extending main body locking claw 36b. Main body locking claw 36b elastically spreads to the right, locking to locking projection 22b, and cover 30 is locked to clamp body 10 so that it is not easily disengaged.

As shown in FIG. 15, a rubber top affixing foot 37 (or top affixing foot) formed of two affixing feet, offset in the width direction, is disposed on the top surface portion 31 of cover 30 to attach rubber member 40b to cover 30. The tip portions of rubber top affixing foot 37 spread upward from the tip portion, forming a step portion, and have a narrow width above the step portion. The step portion of rubber top affixing foot 17 is not easily removed once locked with the affixing foot receiving holes 45 on rubber members 40a, 40b.

For each rubber member 40a, two sets of rubber top affixing feet 37 are mounted in the lateral direction. In the illustrated embodiment of the present invention, two rubber members 40a, 40b are combined in a cover 30; therefore rubber top affixing feet 37 are provided in a total of four locations.

As shown in FIG. 13, affixing foot forming holes 38 are formed in top surface portion 31 in order to form rubber top affixing foot 37.

The shapes and sizes of cover rubber top holding portions 33a, 33b are the same as the shapes and sizes of clamp body rubber bottom holding portions 13a, 13b. That is, as shown in FIGS. 11 and 14, the radius of rubber top holding portions 33a, 33b is the same as the radius of rubber bottom holding portions 13a, 13b. The width direction position and width of rubber top holding portions 33a, 33b is the same as the width direction position and width of rubber bottom holding portions 13a, 13b. When cover 30 and clamp body 10 are combined, circular holes exactly fitting the holding end portions 42a, 42b of rubber members 40a, 40b are formed on both end portions in the width direction thereof.

The shapes and sizes of cover rubber top affixing feet 37 are the same as the shapes and sizes of clamp body rubber bottom affixing feet 17. A rubber member 40a can be attached both to clamp body 10 and to cover 30.

As shown in FIG. 5, in this embodiment of the present invention, two pipes (narrow pipe P1 of radius d and wide pipe P2 of radius e) are attached to vibration-proof clamp 1.

Following is a description of rubber member 40a for attaching narrow pipe P1, as well as the elements of rubber member 40b for attaching wide pipe P2 which differ from rubber member 40a for attaching narrow pipe P1.

Figure 16:
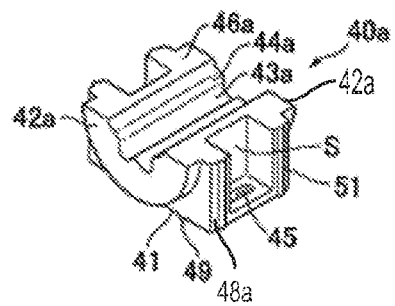
FIG. 16: A perspective view of one of the rubber members in a vibration-proof clamp according to the present invention.
Figure 17:
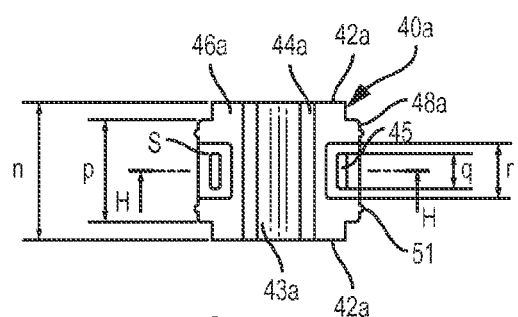
FIG. 17: A top view of the rubber member of FIG. 16.
Figure 18:
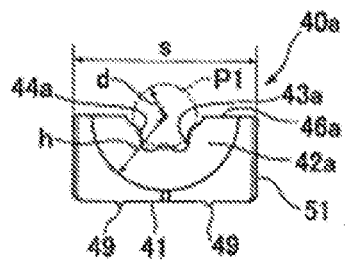
FIG. 18: A front elevation of the rubber member of FIG. 16.
Figure 19:
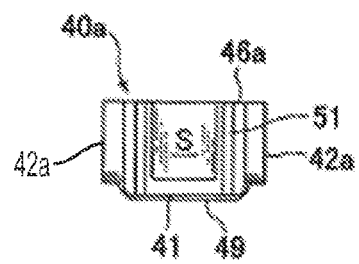
FIG. 19: A right side elevation of the rubber member of FIG. 16.
Figure 20:
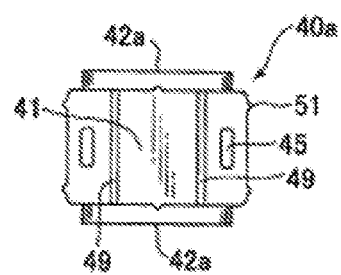
FIG. 20: A bottom view of the rubber member of FIG. 16.
Figure 21:
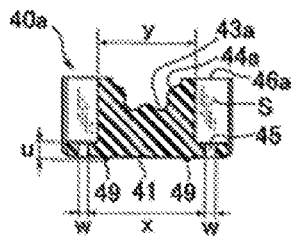
FIG. 21: A cross-section along line H-H of FIG. 17 of the rubber member of FIG. 16.

FIG. 16 is a perspective view of rubber member 40a for use in a vibration-proof clamp 1 for attaching narrow pipe P1. FIG. 17 is a top view; FIG. 18 is a front elevation; FIG. 19 is a right side elevation; and FIG. 20 is a bottom view. FIG. 21 is a cross-section along line H-H in FIG. 17.

Of the two rubber members 40a for attaching narrow pipe P1, one rubber member 40a is attached to clamp body 10, and the other rubber member 40a is attached to cover 30. The two rubber members 40a are the same. Two facing contacting surfaces 46a of the two rubber members 40a are put together, and pipe P1 is sandwiched into the pipe holding space between the two rubber members 40a so that pipe P1 does not directly contact either clamp body 10 or cover 30.

As shown in FIG. 20, which is a bottom plan view, rubber members 40a have an essentially elongated base portion 41 at the bottom. Two bottom portion peaks or ridges 49 extending in the width direction are formed on base portion 41 (See also FIG. 21). When rubber member 40a is attached to clamp body 10, the bottom portion ridges 49 on rubber member 40a contact bottom surface portion 11 on clamp body 10, thereby creating a slight gap between base portion 41 of rubber member 40a and bottom surface portion 11 of clamp body 10.

As shown in FIGS. 16 and 17, rubber members 40a also include two side portion ridges 51, extending in the vertical direction, formed on the lateral end portions 48a of rubber member 40a. Ridges 51 contact clamp body 10 end surface portion 24a, thereby creating a slight gap between side portions of the rubber member 40a (other than side portion ridges 51) and the end surface portion 24a of clamp body 10. As shown in FIG. 7, rubber members 40a and 40b are aligned, but rubber members 40a and 40b make contact with one another only at side portion ridges 51.

Rubber member 40a contacts the bottom surface portion 11 of clamp body 10 only at bottom portion ridges 49, and contacts end surface portion 24a of the clamp body or rubber member 40b only at side portion ridges 51, thereby impeding or attenuating the transfer of vibrations.

As shown in FIG. 7, when rubber member 40a is attached to cover 30, the bottom portion ridges 49 on rubber member 40a contact the top surface portion 31 on cover 30, thereby creating a slight gap between base portion 41 of rubber member 40a and top surface portion 31.

Rubber member 40a contacts the top surface portion 31 of cover 30 only at bottom portion ridges 49, and contacts end surface portion 48a of rubber member 40b at only side portion ridges 51, thereby impeding or attenuating the transfer of vibrations.

As shown in FIGS. 17 and 18, the length of rubber member 40a in the width direction is n, and the lateral length thereof is s. As also shown in FIG. 16, the width direction length of base portion 41 without holding end portion 42a is p.

The width direction length between the interior surfaces of side surface portions 12 of clamp body 10 is essentially the width direction length p of base portion 41, and rubber member 40a fits exactly between the two side surface portions 12 of clamp body 10.

The width direction length between the interior surfaces of the two side surface portions 32 of cover 30 is essentially the same as the width direction length p of base portion 41, and rubber member 40a also fits exactly between the two side surface portions 32 of cover 30.

The lateral length between the two end surface portions 24a, 24b of clamp body 10 is essentially twice the lateral length s of rubber member 40a, and the two rubber members 40a fit exactly between the two end surface portions 24a, 24b.

The lateral length between the two end surface portions 48a, 48b of cover 30 is essentially twice the lateral length s of rubber member 40a, and the two rubber members 40a fit exactly between the end surface portions 48a, 48b.

As shown in front elevation in FIG. 18, rubber member 40a has a semicircular holding end portion 42a on both end portions in the width direction. The distance between the two holding end portions 42a is equal to the distance between the exterior surfaces of the two side surface portions 12 of clamp body 10. The semicircular radius h of the outside diameter of holding end portion 42a is substantially equal to the radius of the inside diameter of rubber bottom holding portions 13a, 13b on clamp body 10, and holding end portion 42a has a shape which exactly fits the clamp body rubber bottom holding portions 13a, 13b.

The distance between the two holding end portions 42a is equal to the gap between the two side surface portions 32 of cover 30. The semicircular radius h of the outside diameter (FIG. 18) of holding end portion 42a is substantially equal to the radius of the inside diameter of rubber top holding portions 33a, 33b on cover 30, and of a shape which exactly fits rubber top holding portions 33a, 33b on cover 30.

As noted above, rubber member 40a has side portion ridges 51 extending in the vertical direction, spaced in the width direction on the lateral end portions. When rubber member 40a is attached to clamp body 10, side portion ridges 51 on rubber member 40a contact end surface portion 24a on clamp body 10, thereby creating a slight gap between the rubber member side portions (other than side portion ridges 51) and end surface portion 24a. When rubber member 40a is attached to cover 30, side portion ridges 51 on rubber member 40a contact end surface portion 48a on cover 30 and a slight gap is opened between the rubber member side portions (other than side portion ridges 51) and end surface portion 48a.

A substantially rectangular depression is formed between the two side portion ridges 51 on the lateral end portions of base portion 41, constituting an affixing foot receiving space S. The lateral interval between the two affixing foot receiving spaces S is y (FIG. 21).

The width direction length of affixing foot receiving space S is r. As shown in FIG. 7, the clamp body rubber bottom affixing foot 17 or the cover rubber top affixing foot 37 can be received into this affixing foot receiving space S.

Affixing foot receiving holes 45 are formed between base portion 41 and affixing foot receiving space S. As shown in FIG. 17, the width direction length of an affixing foot receiving hole 45 is q, and as shown in FIG. 21, the lateral length thereof is w. The interval between two affixing foot receiving holes 45, separated in the lateral direction, is x. The vertical length of an affixing foot receiving hole 45 is u.

Affixing foot receiving holes 45 are able to receive clamp body rubber bottom affixing feet 17 so that a rubber member 40a can be attached to clamp body 10. In addition, affixing foot receiving holes 45 are able to receive cover rubber top affixing feet 37, so that a rubber member 40a can be attached to cover 30.

Figure 9:
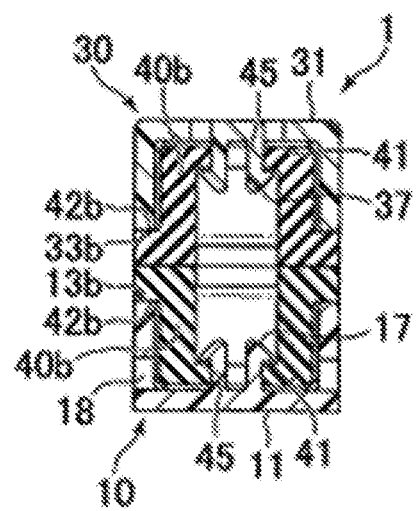
FIG. 9: A cross-section along line E-E of the vibration-proof clamp of FIG. 7.

As shown in FIG. 9, which is a cross-section along line E-E of FIG. 7, the width direction length q of affixing foot receiving hole 45 (FIG. 17) is smaller than the broad width of the tip portion of the two affixing feet on rubber bottom affixing feet 17, and is substantially equal to the width below the two affixing feet step portions. As the two affixing feet on rubber bottom affixing foot 17 are pressed into an affixing foot receiving hole 45, the two feet on rubber bottom affixing feet 17 bend and pass through affixing foot receiving hole 45; the two affixing feet on rubber bottom affixing foot 17 then spread, and the step portion of rubber bottom affixing foot 17 engages a ledge created by affixing foot receiving hole 45, and thus cannot easily be dislodged. Rubber member 40b is thus affixed to clamp body 10.

Similarly, the width direction length of affixing foot receiving hole 45 is smaller than the outside width of the tip portion of the two feet on rubber top affixing foot 37, and as the two feet on rubber top affixing foot 37 are pressed into affixing foot receiving hole 45, the two feet on rubber top affixing foot 37 bend and pass through affixing foot receiving hole 45; the two feet on rubber top affixing foot 37 spread and thus cannot easily be dislodged. Rubber member 40b is thus also affixed to cover 30.

Referring to FIGS. 5, 7 and 16-18, rubber member 40a includes a pipe holding portion 43a for holding pipe P1 and has multiple radially-extending ribs 44a also extending in the width direction. Between adjacent ribs 44a are channels. The radius of the circle connecting the peaks of ribs 44a is smaller than the radius d of pipe P1; thus ribs 44a can hold pipe P1 and can be compressed by pipe P1. On the other hand, the radius of the circle connecting the bottom portion of the channels between ribs 44a is slightly larger than the radius d of pipe P1.

The surface on the opposite side to base portion 41 of respective rubber members 40a is contact surface 46a. When the two contact surfaces 46a of rubber members 40a are put together, a substantially cylindrical pipe holding space comprised of the ribs 44a and their respective channels is formed between them, and, when viewed in side elevation, the assembly of the two holding end portions 42a, 42a of respective rubber members 40a, 40a thus forms a substantially circular shape. The top end portion of rubber member pipe holding portion 43a is the deepest part of the channel, therefore when two rubber members 40a are combined, a single channel is formed.

As shown in FIG. 5, when rubber member 40a is placed in clamp body rubber bottom holding portion 13a, the rubber member contact surface 46a and the clamp body top surface 23 lie substantially in the same plane.

When rubber member 40a is placed in cover rubber top holding portion 33a, the rubber member contact surface 46a and the cover bottom surface 39 also lie substantially in the same plane.

In the illustrated example, there are three ribs 44a for a single rubber member 40a. By holding pipe P1 with the rib parts only, there is a greater vibration dampening effect compared to supporting the pipe side surface with the entire rubber member.

The height, width, number, etc. of ribs 44a can be selected in the light of the pipe holding strength, vibration absorbing effect, etc.

Any desired material may be used as the material for rubber member 40a, so long as it is capable of effectively attenuating vibration. Preferred materials include elastic or resilient materials such as soft elastomer, rubber (synthetic rubber, natural rubber), or the like.

Figure 22:
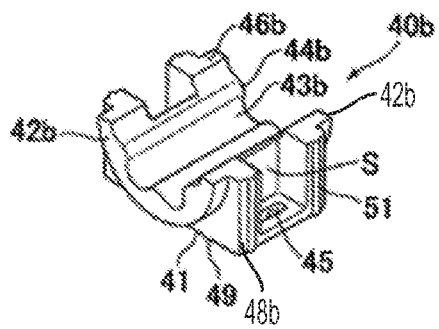
FIG. 22: A perspective view of another rubber member in a vibration-proof clamp according to the present invention.
Figure 23:
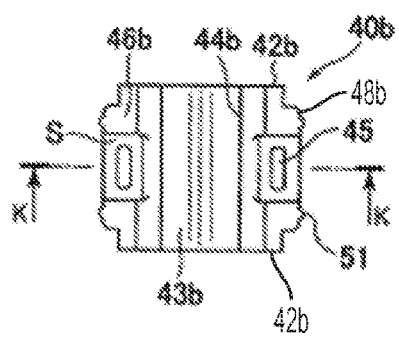
FIG. 23: A top view the rubber member of FIG. 22.
Figure 24:
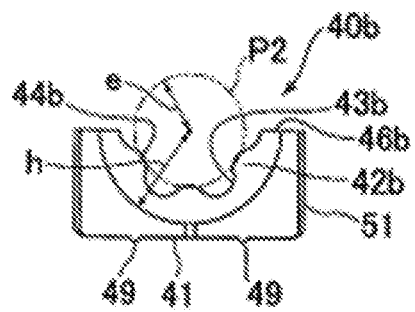
FIG. 24: A front elevation of the rubber member of FIG. 22.
Figure 25:
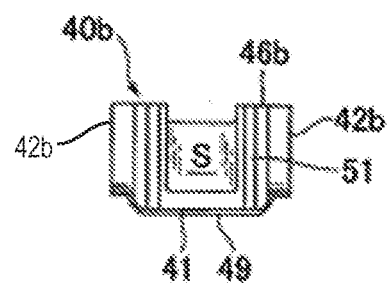
FIG. 25: A right side elevation of the rubber member of FIG. 22.
Figure 26:
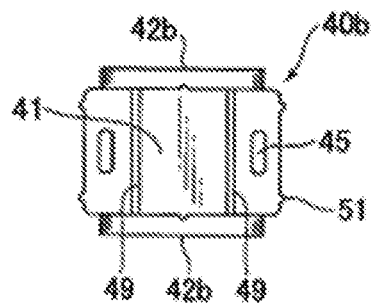
FIG. 26: A bottom view of the rubber member of FIG. 22.
Figure 27:
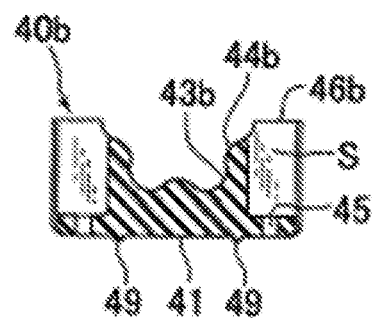
FIG. 27: A cross-section along line K-K of FIG. 23 of the rubber member of FIG. 22.

FIG. 22 is a perspective view of another rubber member 40b on vibration-proof clamp 1 for attaching a thick pipe P2. FIG. 23 is a top view; FIG. 24 is a front elevation; FIG. 25 is a right side elevation; FIG. 26 is a bottom plan view. FIG. 27 is a cross-section along line K-K in FIG. 23.

A pipe P2 of greater diameter than pipe P1 is attached to rubber member 40b. The rubber member contact surface 46a for attaching pipe P1 is continuous from end portion to end portion in the width direction (FIG. 16), but the rubber member contact surface 46b for attaching pipe P2 is divided in the width direction (FIG. 22).

When the two rubber members 40b are put together, contact surface 46b makes contact close to the width direction end portion (FIG. 5), but does not make contact at the width direction center portion (FIG. 7).

Locations where the dimensions of rubber member 40a and rubber member 40b are uniform are as shown in Table 1.

TABLE 1

Dimensions of Each Rubber Member Part

| Part | Location | Symbol |
| --- | --- | --- |
| Rubber members 40a, 40b | Length in width direction | n |
| | Length in lateral direction | s |
| Holding end portions 42a, 42b | Radius | h |
| Base portion 41 | Length in width direction | p |
| Affixing foot receiving space S | Length in width direction | r |
| Affixing foot receiving hole 45 | Length in width direction | q |
| | Length in lateral direction | w |
| | Length in vertical direction | u |
| | Spacing | x |

The positions and dimensions of holding end portions 42b of rubber member 40b are the same as the positions and dimensions of holding end portions 42a of rubber member 40a. Therefore, rubber bottom holding portion 13a for rubber member 40a can be given the same shape and size as rubber bottom holding portion 13b for rubber member 40b. With respect to cover 30, the rubber top holding portion 33a for rubber member 40a may be given the same shape as rubber top holding portion 33b for rubber member 40b.

The affixing foot receiving holes 45 have the same positions and dimensions in rubber member 40a and rubber member 40b. Therefore the rubber bottom affixing foot 17 on clamp body 10 has the same shape and position as rubber top affixing foot 37 on cover 30.

Rubber member 40a and rubber member 40b differ with respect to the diameters of the pipes they hold. Also the shape and size of pipe holding portion 4a on rubber member 40a (channel between ribs 44a) differ from the shape and size of pipe holding portion 43b (channel between ribs 44b) on rubber member 40b.

By using different colors for rubber member 40a and rubber member 40b, rubber member 40a can be distinguished from rubber member 40b.

In the illustrated embodiment of the present invention, the cases in which a narrow pipe P1 of radius d and a wide pipe P2 of radius e are held have been explained, but pipe diameters are not limited thereto. The dimensions of certain parts of the rubber member can be standardized irrespective of pipe diameter, enabling the formation of rubber members for a variety of pipe diameters.

However, the semicircular outside diameter h of holding end portions 42a and 42b is fixed (FIG. 24), and the part of the rubber member that holds the pipe must have a certain thickness or greater, so there are upper limits to the dimensions of pipes which can be attached.

Referring to FIGS. 4 and 9, the assembly of a vibration-proof clamp 1 in which a clamp body 10, a cover 30, two rubber members 40a and two rubber members 40b will be described next.

Figure 8:
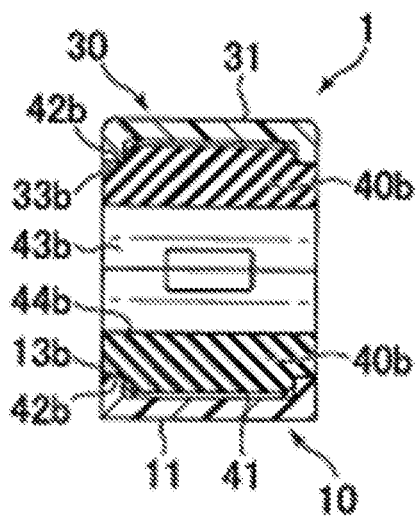
FIG. 8: A cross-section along line J-J of the vibration-proof clamp of FIG. 5.

The two rubber members 40a, 40b are attached to clamp body 10. As shown in FIGS. 7 and 8, the bottom portion ridges 49 formed on the base portion 41 of rubber member 40a contact the bottom surface portion 11 of clamp body 10, and there is a slight gap between the base portion 41 of rubber member 40a and the bottom surface portion 11 of clamp body 10.

Also, the side portion ridges 51 formed on the side portion of rubber member 40a contact the end surface portion 24a of clamp body 10 (FIG. 9), and there is a slight gap between the side portions (other than side portion ridges 51) and the end surface portion 24a of clamp body 10.

On both end portions in the width direction, holding end portion 42a on rubber member 40a fits exactly into rubber bottom holding portion 13a on clamp body 10. The rubber member 40a contact surface 46a is in substantially the same plane as the top surface 23 of clamp body 10.

Two rubber members 40a, 40b are attached to cover 30. The bottom portion ridges 49 formed on rubber member 40a base portion 41 contact the top surface portion 31 of cover 30, so that there is a slight gap between rubber member 40a base portion 41 and cover top surface portion 31.

The side portion ridges 51 formed on the side portion of rubber member 40a (FIG. 16) contact the edge surface portion 48a on cover 30 (FIG. 7), and thus forms a slight gap between the side portions adjacent to side portion ridges 51 and the edge surface portion 48a on cover 30.

As shown in FIG. 5, in both end portions in the width direction, rubber member 40a fits exactly into cover rubber top holding portion 33a. The rubber member 40a contact surface 46a lies substantially in the same plane as cover bottom surface 39.

The bottom surface 39 of cover 30 contacts the top surface 23 of clamp body 10. The contact surface 46a of rubber member 40a attached to cover 30 contacts the contact surface 46a of rubber member 40a attached to clamp body 10.

Rubber bottom affixing foot 17 of clamp body 10 engages an affixing foot receiving hole 45 in rubber member 40a (or engages an affixing foot receiving hole 45 in rubber member 40b).

Rubber members 40a, 40b of the same shapes and sizes (except for their respective inner radii d, e) are also connected to cover 30. The bottom end portions end surface portions 48a, 48b on cover 30 respectively contact the top end portions of end surface portions 24a, 24b on clamp body 10.

The main body locking feet 35a, 35b on cover 30 are respectively inserted into locking foot receiving holes 19a, 19b on clamp body 10. Main body locking claws 36a, 36b respectively engage locking projections 22a, 22b, and cover 30 is thus affixed to clamp body 10.

Now referring to FIG. 5, a pipe holding space for holding pipe P1 is formed by a rubber member pipe holding portion 43a held to clamp body 10, and by a rubber member pipe holding portion 43a held to cover 30. A pipe holding space for holding pipe P2 is formed by the rubber member pipe holding portion 43b held to clamp body 10, and by the rubber member pipe holding portion 43b held to cover 30. As shown in FIGS. 5, 8, 16 and 22, the holding end portions 42a, 42b of the resilient members 40a, 40b define respective (unnumbered) end surfaces in the width direction which are substantially coplanar with respective side surface portions 12, 32 of the top holding portions 33a, 33b and bottom holding portions 13a, 13b.

A stud (not shown) is inserted into the clamp body 10 locking portion 20 (FIG. 10), enabling locking claws 27 to engage the stud.

In order to hold pipes P1, P2 in the pipe holding space between clamp body rubber bottom holding portions 13a, 13b and cover rubber top holding portion 33a, 33b, respectively, one group of rubber members 40a, 40b is attached to clamp body 10, and another group of rubber members 40a, 40b is attached to cover 30.

The clamp 1 is disposed so that pipe holding portions 43a, 43b in clamp body 10 contact the bottom sides of pipes P1, P2. A cover 30 onto which rubber members 40a, 40b are mounted is then assembled to clamp body 10 from the top sides of the pipes P1, P2.

At this point, the main body locking feet 35a, 35b on cover 30 respectively enter the locking foot receiving holes 19a, 19b in clamp body 10, and main body locking claws 36a, 36b respectively engage locking projections 22a, 22b.

As a result, pipes P1 and P2 are respectively held between the rubber members 40a, 40b held in clamp body 10, and the rubber members 40a, 40b held in cover 30.

Rubber members 40a, 40b are interposed between pipes P1 and P2, clamp body 10, and cover 30 in all respective locations, so that pipes P1, P2 do not directly contact clamp body 10 or cover 30. Rubber members 40a, 40b have sufficient thickness to assure that the clamp 1 of the present invention is sufficiently vibration-proof. Therefore, a highly vibration-proof clamp can be obtained.

The components of vibration-proof clamp 1 are clamp body 10, cover 30, two rubber members 40a, and two rubber members 40b.

Rubber members 40a or 40b can attach the same item to both clamp body 10 and cover 30. The shapes of the parts for attaching rubber member 40a or rubber member 40b to clamp body 10 or cover 30 are uniform.

Clamp body 10, cover 30, and the four rubber members 40a, 40b can be easily assembled by hand. The cost of the vibration-proof clamp 1 of the present invention can therefore be kept low.

When attaching pipes with the same pitch (spacing) as in FIG. 5, but differing in diameter from P1 (radius d) or P2 (radius e), the pipes can be held by using the same clamp body 10 and cover 30 as in FIG. 5, but using separate rubber members matched to the diameter of the pipes being attached.

Inasmuch as the same clamp body 10 and cover 30 are used even though the pipe diameters differ, no mis-assembly prevention mating portion nor mis-assembly prevention shape need be formed. To identify for which pipe size a rubber member is used, the rubber members can be manufactured with different-colored materials. Or, they can be colored with different colors or can be given different markings. Identifying rubber members with colors is easier than identifying rubber members with mis-assembly prevention mating portions or mis-assembly prevention shapes.

Thus, one discrete set of rubber members 40a, 40a and a separate discrete set of rubber members 40b, 40b are used to clamp two pipes, each set being sized to clamp a pipe of a particular diameter.

If the diameter of pipes being attached is the same as P1 (radius d) or P2 (radius e) shown in FIG. 5, and pipe pitch (spacing) varies, the pipes can be held by using the same rubber members 40a, 40b matched to those pipes, but varying the pitches of the clamp body rubber bottom holding portions 13 and the pitches of the cover rubber top holding portions 33.

According to one embodiment of the present invention, when pipe pitch is the same and different diameters of pipe are attached, it is sufficient to use the same clamp body 10 and cover 30, changing only the rubber members to ones fitting the diameters of the pipes used. Inasmuch as the same clamp body 10 and cover 30 are used, cost is reduced.

When attempting to attach the same pipes at different pitches, it is sufficient to use the same rubber members and only change the clamp body 10 and cover 30 to ones fitting that pipe pitch. Since it is unnecessary to fabricate separate molds for the rubber members, cost can be reduced in this case as well.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A vibration-proof clamp for holding multiple elongated members, each elongated member having respective first and second semicircular portions, comprising:
   a clamp body having multiple bottom holding portions for holding the elongated members, and a locking portion for locking to an attached member;
   a cover connected to the clamp body so as to cover the holding portions of the clamp body;
   multiple first resilient members attached to the clamp body, each configured to hold a surface of the first semicircular portion of each of the elongated members;
   multiple second resilient members attached to the cover, each configured to hold a surface of the second semicircular portion of each of the elongated members, respective second resilient members having the same size and shape as respective first resilient members; wherein
   each first and second resilient member together forming a discrete and separate set;
   each discrete and separate set of first and second resilient members being configured to hold a single, particular elongated member;
   the first and second resilient members each having two respective end portions in the width direction;
   each end portion defining respective holding end portions in the width direction;
   the first and second resilient member holding end portions are semicircular in cross section;
   the first and second resilient member holding end portions define radially-inwardly-extending ribs which also extend in the width direction;
   the shapes and sizes of the first and second resilient member holding end portions supporting each elongated member being the same, except that the ribs of each set defining circles having radii sized to hold a particular elongated member;
   the clamp body multiple bottom holding portions being of a shape and size conforming to the holding end portions, in order to support the first resilient member holding end portions on both end portions in the width direction, the shapes and sizes of each of the bottom holding portions being the same; and wherein
   the cover having multiple top holding portions of a shape and size conforming to the holding end portions, in order to support the second resilient member holding end portions on both end portions in the width direction, the shapes and sizes of each of the top holding portions being the same;
   the clamp body bottom holding portions and the cover top holding portions are semicircular in cross section; whereby
   multiple discrete and separate sets of first and second resilient members being supported, respectively, in the top and bottom holding portions; and wherein
   the holding end portions of the resilient members define respective end surfaces in the width direction which are substantially coplanar with respective side surface portions of the top holding portions and the bottom holding portions; whereby
   when the cover is attached to the clamp body, the elongated members are clamped between respective sets of resilient members; such that
   the clamp can accommodate elongated members having semicircular portions of different diameters while using the same clamp body and cover.

2. The vibration-proof clamp claimed in claim 1, wherein: elongated members of different diameters are clamped in the clamp; and
   each discrete and separate set of first and second resilient members being sized to clamp respective elongated members having different diameters; such that
   the same clamp body and cover are used to hold the different-sized sets of resilient members.

3. The vibration-proof clamp claimed in claim 1, wherein the clamp accommodates elongated members of differing diameters while using the same clamp body and cover.

4. The vibration-proof clamp claimed in claim 3, wherein the resilient members used on elongated members of differing diameters are of different colors, to identify for which size of elongated member a resilient member is to be used.

5. The vibration-proof clamp claimed in claim 1, wherein the clamp requires no mis-assembly prevention mating portion nor mis-assembly prevention shape.

6. The vibration-proof clamp claimed in claim 1, wherein the first and second resilient member holding end portions include facing contact surfaces when assembled in respective top and bottom holding surfaces, so that the assembled first and second resilient member holding end portions, when viewed in side elevation, are substantially circular in shape.

7. The vibration-proof clamp claimed in claim 6, wherein the first resilient member contact surface lying substantially in the same plane as a top surface of the clamp body bottom holding portion.

8. The vibration-proof clamp claimed in claim 1, wherein:
   the first resilient members including respective base portions;
   the base portions defining bottom portion ridges extending in the width direction; and wherein
   the bottom portion ridges engaging a bottom surface portion of the clamp body, such that a slight gap is created between the resilient member base portion and the bottom surface portion of the clamp body; whereby transmission of vibrations via the resilient members and the clamp base are further attenuated.

9. The vibration-proof clamp claimed in claim 8, wherein:
the second resilient members including respective base portions;
the base portions defining bottom portion ridges extending in the width direction; and wherein
the bottom portion ridges engaging a top surface portion of the cover, thereby creating a slight gap between the resilient member base portion and the top surface portion of the cover; whereby
transmission of vibrations via the resilient members and the cover are further attenuated.

10. The vibration-proof clamp claimed in claim 8, wherein:
the first and second resilient members further including respective lateral end portions;
the lateral end portions defining side portion ridges extending in the vertical direction; and wherein
the side portion ridges engaging an end surface portion of the clamp body, thereby creating a slight gap between the resilient member lateral end portions and the end surface portion of the clamp body; whereby
transmission of vibrations via the resilient members and the clamp body are further attenuated.

11. The vibration-proof clamp claimed in claim 1, wherein:
the clamp body including a bottom affixing foot for affixing the first resilient member;
the cover has a top affixing foot of the same shape as the bottom affixing foot for affixing the second resilient member; and wherein
the first and second resilient members defining affixing foot receiving holes in order to insert bottom affixing feet or top affixing feet therein; whereby
the clamp body bottom affixing foot is inserted into the first resilient member affixing foot receiving hole so that the first resilient member is joined to the clamp body; and
the cover top affixing foot is inserted into the second resilient member affixing foot receiving hole so that the second resilient member is joined to the cover.

12. The vibration-proof clamp claimed in claim 1, wherein:
the cover including a main body locking portion having a tip portion;
the tip portion including a folded-back elastically-deformable locking claw; and
the clamp body defining a locking projection for the cover locking claw to engage; whereby
the cover is joined with the clamp body by locking the cover locking claw with the locking projection on the clamp body.

13. A vibration-proof clamp for holding multiple elongated members, each elongated member having respective first and second semicircular portions, comprising:
a clamp body having multiple bottom holding portions for holding the elongated members, and a locking portion for locking to an attached member;
a cover connected to the clamp body so as to cover the holding portions of the clamp body;
multiple first resilient members attached to the clamp body, each configured to hold a surface of the first semicircular portion of each of the elongated members;
multiple second resilient members attached to the cover, each configured to hold a surface of the second semicircular portion of each of the elongated members, respective second resilient members having the same size and shape as respective first resilient members; wherein
each first and second resilient member together forming a discrete and separate set;
each discrete and separate set of first and second resilient members being configured to hold a single, particular elongated member;
the first and second resilient members each having two respective end portions in the width direction;
each end portion defining respective holding end portions in the width direction;
the first and second resilient member holding end portions are semicircular in cross section;
the first and second resilient member holding end portions define radially-inwardly-extending ribs which also extend in the width direction;
the shapes and sizes of the first and second resilient member holding end portions supporting each elongated member being the same, except that the ribs of each set defining circles having radii sized to hold a particular elongated member;
the clamp body multiple bottom holding portions being of a shape and size conforming to the holding end portions, in order to support the first resilient member holding end portions on both end portions in the width direction, the shapes and sizes of each of the bottom holding portions being the same; and wherein
the cover having multiple top holding portions of a shape and size conforming to the holding end portions, in order to support the second resilient member holding end portions on both end portions in the width direction, the shapes and sizes of each of the top holding portions being the same;
the clamp body bottom holding portions and the cover top holding portions are semicircular in cross section; whereby
multiple discrete and separate sets of first and second resilient members being supported, respectively, in the top and bottom holding portions; and wherein
when the cover is attached to the clamp body, the elongated members are clamped between respective sets of resilient members; such that
the clamp can accommodate elongated members having semicircular portions of different diameters while using the same clamp body and cover; and wherein
the clamp accommodates elongated members spaced at different pitches while using the same first and second resilient members, so that only the clamp body and cover need be changed to accommodate the different pitches of the elongated members.

14. A vibration-proof clamp for holding multiple elongated members, each elongated member having respective first and second semicircular portions, comprising:
a clamp body having multiple bottom holding portions for holding the elongated members, and a locking portion for locking to an attached member;
a cover connected to the clamp body so as to cover the holding portions of the clamp body;
multiple first resilient members attached to the clamp body, each configured to hold a surface of the first semicircular portion of each of the elongated members;
multiple second resilient members attached to the cover, each configured to hold a surface of the second semicircular portion of each of the elongated members, respective second resilient members having the same size and shape as respective first resilient members; wherein the first resilient members further including respective base portions;

the base portions defining bottom portion ridges extending in the width direction; and wherein the bottom portion ridges engaging a bottom surface portion of the clamp body, such that a slight gap is created between the resilient member base portion and the bottom surface portion of the clamp body; whereby transmission of vibrations via the resilient members and the clamp base are further attenuated; and wherein the first and second resilient members further including respective lateral end portions;

the lateral end portions defining side portion ridges extending in the vertical direction; and wherein the side portion ridges engaging an end surface portion of the clamp body, thereby creating a slight gap between the resilient member lateral end portions and the end surface portion of the clamp body; whereby transmission of vibrations via the resilient members and the clamp body are further attenuated; and wherein, when respective sets of resilient members are aligned side-by-side in the clamp, the resilient members contact one another only at their respective side portion ridges;

each first and second resilient member together forming a discrete and separate set;

each discrete and separate set of first and second resilient members being configured to hold a single, particular elongated member;

the first and second resilient members each having two respective end portions in the width direction;

each end portion defining respective holding end portions in the width direction;

the first and second resilient member holding end portions are semicircular in cross section;

the first and second resilient member holding end portions define radially-inwardly-extending ribs which also extend in the width direction;

the shapes and sizes of the first and second resilient member holding end portions supporting each elongated member being the same, except that the ribs of each set defining circles having radii sized to hold a particular elongated member;

the clamp body multiple bottom holding portions being of a shape and size conforming to the holding end portions, in order to support the first resilient member holding end portions on both end portions in the width direction, the shapes and sizes of each of the bottom holding portions being the same; and wherein the cover having multiple top holding portions of a shape and size conforming to the holding end portions, in order to support the second resilient member holding end portions on both end portions in the width direction, the shapes and sizes of each of the top holding portions being the same;

the clamp body bottom holding portions and the cover top holding portions are semicircular in cross section; whereby multiple discrete and separate sets of first and second resilient members being supported, respectively, in the top and bottom holding portions; and wherein when the cover is attached to the clamp body, the elongated members are clamped between respective sets of resilient members; such that the clamp can accommodate elongated members having semicircular portions of different diameters while using the same clamp body and cover.

* * * * *